Figure 1:
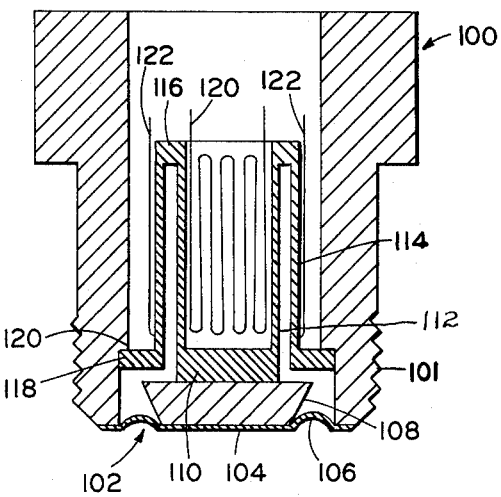

Feb. 15, 1966  YAO T. LI  3,234,795

PRESSURE PICKUP

Original Filed July 27, 1959

INVENTOR.
YAO T. LI
BY
Ezekiel Wolf, Wolf & Greenfield
ATTORNEY

United States Patent Office 3,234,795
Patented Feb. 15, 1966

3,234,795
PRESSURE PICKUP
Yao T. Li, 42 Carleton St., South Lincoln, Mass.
Original application July 27, 1959, Ser. No. 829,857, now Patent No. 3,138,027, dated June 23, 1964. Divided and this application Nov. 23, 1962, Ser. No. 239,418
4 Claims. (Cl. 73—398)

This invention relates to pressure gages and more particularly comprises a new and improved pressure gage of miniature size and capable of measuring pressures of a high order. This application is a division of my copending application, Serial No. 829,857, filed July 27, 1959, entitled Pressure Gage, now Patent Number 3,138,027.

Diaphragms are commonly used today as pressure sensing elements or pickups in gages particularly designed to measure high pressures; that is, pressures in the order of 10,000 pounds per square inch (p.s.i.). For the same maximum stress, the diameter of the diaphragms used as the pressure pickups must increase with increases in the intended pressure range to obtain a given diaphragm deflection. The increased diaphragm diameter effects a greater volumetric displacement of the liquid medium whose pressure is being measured. The greater volumetric displacement of the liquid in turn causes a greater disturbance of the hydraulic system and an intolerable amount of energy may be withdrawn from the liquid as a result of its displacement. The volumetric displacement of the liquid medium becomes more critical when the volume of the medium is relatively small.

A common application of gages of the type which I have invented is the measurement of pressure of hydraulic oil in a servo valve. In such a setting, the hydraulic oil may have a volume of but a few cubic centimeters. As the energy withdrawn from a liquid is proportional to its change in volume, a change in the volume of the oil of even .01 cubic centimeter may be more than the hydraulic system can withstand. Thus, it will be appreciated that gages having relatively large diameter diaphragms as sensing elements are often unacceptable.

The primary object of my invention is to avoid the necessity of increasing the diameters of sensing diaphragms when measuring pressures of a high order. By permitting the use of small diaphragms even when the pressures being measured are extremely high, I avoid the loss of excessive amounts of energy in the liquid medium whose pressure is being measured.

To accomplish this and other objects of my invention, I employ a very small, thin and flexible diaphragm across the bottom of the pressure gage frame as the sensing or pickup element. The thin flexible diaphragm is elastically restrained by two strain tubes telescopically arranged one within the other. The lower end of the outer tube is secured to the housing in the region of the thin diaphragm while the lower end of the inner tube is secured to a block which in turn is seated in the flat central portion of the thin diaphragm. The upper ends of the two tubes are rigidly connected together. Although the tubes are exposed to relatively high temperatures, the manner in which the tubes are assembled renders them substantially insensitive to the higher temperatures.

Figure 2:
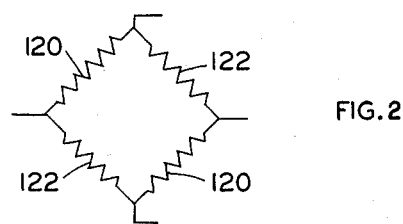

These and other objects and features of my invention along with its incident advantages will be better understood and appreciated from the following detailed description of one embodiment thereof, selected for purposes of illustration, and shown in the accompanying drawing in which:

FIG. 1 is a cross-sectional elevational view of one embodiment of my invention; and FIG. 2 is a schematic diagram of the signal generator of the embodiment of FIG. 1.

The embodiment of my invention shown in FIG. 1 includes a frame 100 generally cylindrical in shape having a lower externally threaded section 101 to facilitate anchoring the frame in the wall of a chamber containing a medium whose pressure is to be measured. The length of the frame 100 will vary with different applications and the thickness of the chamber wall containing the medium whose pressure is to be measured will at least in part dictate that length. The frame 100 is closed at its lower end by a thin and flexible diaphragm 102 having a flat circular central portion 104 and a surrounding annular dished portion 106. The periphery of the diaphragm 102 surrounding the dished portion 106 is welded to the lower terminal portion of the frame 100.

Welded in the flat circular seat formed in the central portion 104 of the diaphragm 102 is a motion transmitting block 108 also secured to the lower end 110 of the inner of two strain tubes 112 and 114. The strain tubes 112 and 114 form part of the signal generator of the pressure gage.

The coaxially oriented strain tubes 112 and 114 may be integrally formed from a single piece of stock and are connected together at their upper ends as suggested at 116. A flange 118 extends outwardly from the lower terminal portion of the outer tube 114 and is secured to a shoulder 120 formed on the inner surface of the frame 100. Thus, as an upwardly directed force is applied to the lower portion 110 of the inner tube 112 the inner tube 112 acts in compression while the outer tube 114 acts in tension to elastically restrain the force. As a result, when pressure is applied against the lower face of the diaphragm 102 the inner tube 112 is compressed and the outer tube 114 is elongated.

A number of windings 120 and 122 are bonded longitudinally along each of the strain tubes and are stretched and relaxed in response to deformation of the tubes. The windings 120 extending longitudinally of the inner tube 112 form a pair of opposite arms in the conventional bridge circuit shown in FIG. 2, while the windings 122 secured to the outer tube 114 comprise the other pair of opposed arms in the bridge. Because all of the windings are bonded to the tubes under tension, their change in resistance varies directly with the extent of the deformation of each tube. As a force is directed against the diaphragm 102 the tension of the windings 120 on the inner tube 112 will be somewhat relaxed and their resistance will decrease while the windings 122 carried on the outer tube 114 will be further stressed and their resistance will increase. Therefore, when these windings are connected to form a bridge circuit as suggested in FIG. 1, the bridge will produce an output signal directly proportional to the pressure applied against the diaphragm 102.

Although the strain tubes 112 and 114 are not mechanically screened from the relatively high temperatures which may be encountered, nevertheless, the net effect of these temperatures upon the pressure gage is effectively zero. The temperature compensation results from the fact that the two tubes are subjected to the same temperature and each will be elongated the same amount in response to a particular temperature rise. Thus, while the connection 116 between the two tubes may move upwardly in the frame 100 in response to an increase in temperature, the lower terminal portion 110 of the inner tube 112 will remain stationary and exert a constant restraining force against the inside of the diaphragm 102.

The use of two strain tubes has still another advantage. A greater output is derived when each of the strain windings is disposed longitudinally with respect to the tube.

If but one tube were used as the elastic restraining member, and one pair of windings was wound longitudinally while the other pair was wound circumferentially about the tube, from Poisson's ratio, the circumferential windings would be subjected to only one third the strain of the longitudinal windings. However, by employing two tubes pure tension and compression may be utilized as shown in the drawing and a higher output results.

It will be noted in FIG. 1 that the diameter of the force transmitting block 108 is greater than the diameter of the outer strain tube 114. As a result, the lower terminal portion of the outer tube 114 and its flange 118 serve as a stop to prevent excessive forces applied to the diaphragm 102 from damaging the signal generator. The distance between the upper surface of the block 108 and the flange 118 defines the maximum displacement of the diaphragm 102 and the distortion of the tubes 112 and 114.

In the embodiment of my invention shown sharp ridges are avoided in the diaphragm because the diaphragm is supported by a flat solid wall as opposed to one or more sharp edges. The sharp edges found on such devices as strain tubes used in the prior art to support several catenary sections formed in the diaphragms severely weaken the diaphragms when pressures of a high order are exerted against them for long durations. Moreover, because the strain tube 112 is secured to the thin diaphragm 102, twisting of the diaphragm is avoided.

From the foregoing description, those skilled in the art will appreciate that numerous modifications may be made of my invention without departing from its spirit. Therefore, I do not intend to limit the breadth of my invention to the single embodiment illustrated and described. Rather, it is my intention that the breadth of my invention be determined by the dependent claims and their equivalents.

What is claimed is:

1. A pressure gage comprising,
a cylindrical frame,
a thin and flexible diaphragm extending across and closing one end of the frame, said diaphragm having a flat central portion and a dished annular portion surrounding the central portion,
a pair of coextensive concentric strain tubes made of the same material disposed coaxially in the frame and connected together at their upper ends,
means securing the lower end of the inner strain tube to the flat central portion of the diaphragm,
means connecting the lower end of the outer strain tube to the frame,
electrical windings extending longitudinally on and bonded to each of the tubes,
and means for detecting variations in the resistance of the windings,
said tubes affording substantially the entire elastic restraint against pressure exerted on the thin diaphragm.

2. In a pressure gage,
a cylindrical frame having an externally threaded end,
a thin and flexible diaphragm extending across and closing that end of the frame, said diaphragm having a flat central portion an a dished annular portion surrounding the central portion,
a pair of coextensive concentric strain tubes disposed coaxially in the frame and connected together at their upper ends,
means securing the lower end of the inner strain tube to the flat central portion of the diaphragm,
and means connecting the lower end of the outer strain tube to the frame within the threaded end.

3. In a pressure gage,
a cylindrical frame,
a thin and flexible diaphragm extending across and closing one end of the frame,
a pair of coextensive concentric inner and outer strain tubes disposed coaxially in the frame,
means anchoring the lower end of the outer tube adjacent the end of the frame in the region of the diaphragm,
means joining the upper ends of the tubes and free of connections to the frame,
and means connecting the lower end of the inner tube to the diaphragm inwardly of its periphery.

4. In a pressure gage,
a cylindrical frame having an externally threaded end for anchoring the gage in the wall of a chamber whose internal pressure is to be measured,
a diaphragm extending across and with its periphery secured to and closing that end of the frame,
an outer cylinder having one end secured to the frame within the threaded end and extending away from the diaphragm in the frame,
an inner strain tube coextensive with and secured at one end to the other end of the outer cylinder and extending to the plane of the one end of the outer cylinder, said tube and cylinder being made of a material having the same coefficient of expansion,
means securing the other end of the strain tube to the diaphragm inwardly of the diaphragm periphery,
and strain windings secured to the strain tube and responsive to deformation of the strain tube as the result of loads applied to the diaphragm.

References Cited by the Examiner

UNITED STATES PATENTS

| | | | |
|---|---|---|---|
| 2,172,694 | 9/1939 | Blondelle | 92—99 |
| 2,327,935 | 8/1943 | Simmons | 73—398 |
| 2,637,210 | 5/1953 | Hathaway | 73—398 |
| 2,814,946 | 12/1957 | Harris | 73—141 |
| 2,942,219 | 6/1960 | McGrath | 73—398 |
| 2,989,868 | 6/1961 | Rosenberger | 73—407 |

RICHARD C. QUEISSER, *Primary Examiner.*